A. W. THIELEPAPE.
ICE CARRIER FOR AUTOMOBILES.
APPLICATION FILED MAY 24, 1919.

1,355,187. Patented Oct. 12, 1920.

Witnesses
Geo. E. Logan
T. E. Turpin

Inventor
A. W. Thielepape
By Victor J. Evans
Attorney

UNITED STATES PATENT OFFICE.

ARNOLD W. THIELEPAPE, OF AUSTIN, TEXAS, ASSIGNOR OF ONE-HALF TO SCOTT YEAMANS, OF AUSTIN, TEXAS.

ICE-CARRIER FOR AUTOMOBILES.

1,355,187.  Specification of Letters Patent.  Patented Oct. 12, 1920.

Application filed May 24, 1919. Serial No. 299,472.

*To all whom it may concern:*

Be it known that I, ARNOLD W. THIELEPAPE, a citizen of the United States, residing at Austin, in the county of Travis and State of Texas, have invented new and useful Improvements in Ice-Carriers for Automobiles, of which the following is a specification.

The object of my present invention is the provision of an ice carrier for automobiles, susceptible of ready application to the running board of an automobile, adapted when not in use to be conveniently carried in collapsed state, and possessed of the capacity or function of positively engaging a block of ice with a view to retaining the same in the carrier and out of contact with the automobile body.

To the attainment of the foregoing, the invention consists in the peculiar and advantageous carrier hereinafter described and definitely claimed.

In the accompanying drawings, hereby made a part hereof:

Similar numerals of reference designate corresponding parts in all of the views of the drawings.

The running board 1 and the splash guard 2 are the parts of an automobile germane to the application of my invention, and therefore I have deemed it unnecessary to illustrate any other parts of an automobile.

Figure 1:
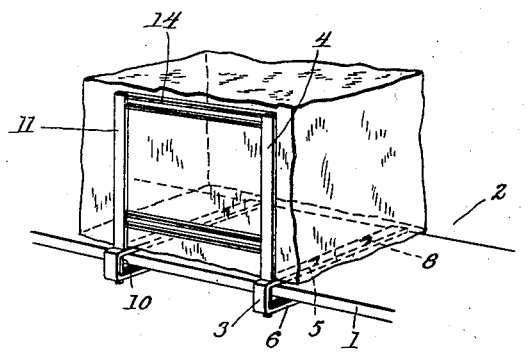
Figure 1 is a perspective showing my novel carrier in use.
Figure 2:
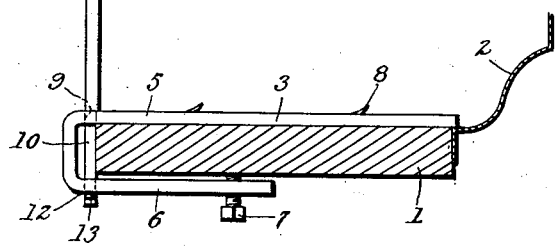
Fig. 2 is a view taken transversely through the running board in a plane at one side of the carrier.
Figure 3:
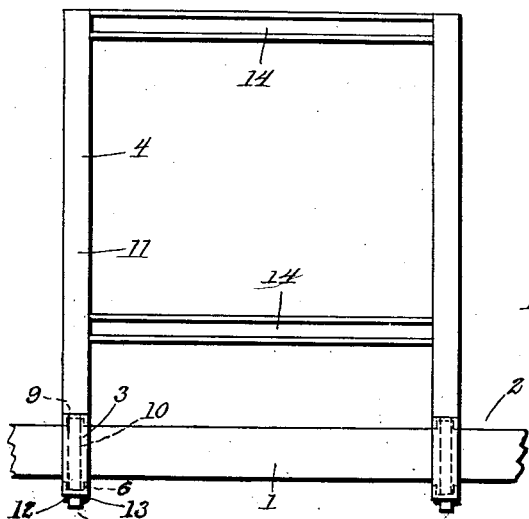
Fig. 3 is a front elevation of the carrier as applied.
Figure 4:
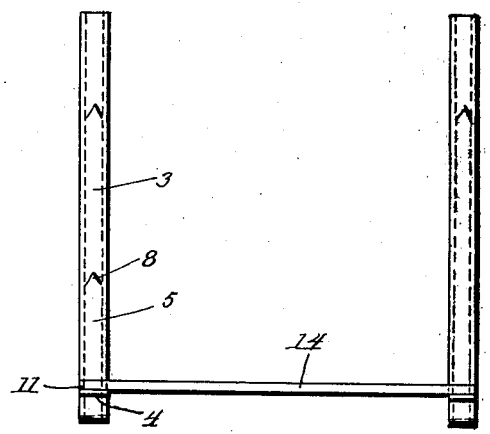
Fig. 4 is a plan view of the carrier.

My novel carrier comprises two attaching members 3 and an upright retaining member 4. The attaching members 3 are each of general U-shape to straddle the running board 1 after the manner best shown in Fig. 2, and each preferably has a comparatively long upper arm 5 designed to bear solidly in superimposed relation upon the running board, and a shorter arm 6 that is disposed below the running board and is equipped with a clamping screw 7. Manifestly the said attaching members may be expeditiously and easily affixed upon the running board without liability of casual movement or displacement, and yet the said attaching members may be readily removed when it is not desired to use the carrier. The upper arms of the members 3 are provided with barbs 8 which are preferably cut and pressed upwardly therefrom and are specifically intended to hold a block of ice against side slip, though they will also manifestly serve to prevent the block, in some cases, from engaging and marring the automobile body. In their upper and lower arms and adjacent to their bights the attaching members 3 are provided with vertically disposed apertures 9. These apertures 9 are designed to receive the lower reduced end portions 10 of the uprights 11 comprised in the retaining member 4; the said end portions 10 being apertured at 12 to receive cotter pins 13 through the medium of which the retaining member is detachably connected to the attaching members.

In addition to the upright members 11, the retaining member 4 includes cross-bars 14, two or more in number, and which cross-bars are formed integral with or are connected to the uprights in any approved manner without affecting my invention.

In practice the upright retaining member 4 may be readily disconnected from the attaching members 3 so that the carrier as a whole may be carried in small compass in any desired part of an automobile.

To apply the carrier, it is simply necessary to position and clamp the members 3 on the running board 1, and then drop the retaining member 4 in and secure the same to the attaching members, when the carrier is ready for use, and will be found to be highly efficient for retaining a block of ice in such position on the automobile that the ice will not injure the automobile or subject the occupants thereof to discomfort.

Having described my invention, what I claim and desire to secure by Letters-Patent is:

1. An ice carrier for automobiles, comprising attaching members equipped to straddle an automobile running board in spaced and parallel relation and carrying clamping screws in their lower arms and having alined vertical apertures in their lower and upper arms adjacent to their bights and also having barbs on their upper arms, an upright retaining member having reduced portions dropped in said apertures of the attaching members and adapted to be held against the edge of a running board, and means detachably connecting said portions of the retaining member to the attaching members.

2. An ice carrier for automobiles, comprising attaching members equipped to straddle an automobile running board in spaced and parallel relation and carrying clamping screws in their lower arms and having alined vertical apertures in their lower and upper arms adjacent to their bights and also having barbs on their upper arms, and an upright retaining member having reduced portions dropped in said apertures of the attaching members and adapted to be held against the edge of a running board.

In testimony whereof I affix my signature.

ARNOLD W. THIELEPAPE.